US011712926B2

(12) United States Patent
Chen et al.

(10) Patent No.: US 11,712,926 B2
(45) Date of Patent: Aug. 1, 2023

(54) POLYURETHANE-CONTAINING TREAD RUBBER COMPOSITIONS AND RELATED METHODS

(71) Applicant: Bridgestone Corporation, Chuo-ku (JP)

(72) Inventors: Yaohong Chen, Akron, OH (US); Mindaugas Rackaitis, Hudson, OH (US); Wei Zhao, Guangzhou (CN)

(73) Assignee: Bridgestone Corporation, Chuo-ku (JP)

( * ) Notice: Subject to any disclaimer, the term of this patent is extended or adjusted under 35 U.S.C. 154(b) by 412 days.

(21) Appl. No.: 16/954,065

(22) PCT Filed: Dec. 13, 2018

(86) PCT No.: PCT/US2018/065385
§ 371 (c)(1),
(2) Date: Jun. 15, 2020

(87) PCT Pub. No.: WO2019/118687
PCT Pub. Date: Jun. 20, 2019

(65) Prior Publication Data
US 2021/0162806 A1    Jun. 3, 2021

Related U.S. Application Data

(60) Provisional application No. 62/599,034, filed on Dec. 15, 2017.

(51) Int. Cl.
| B60C 1/00 | (2006.01) |
| C08G 18/10 | (2006.01) |
| C08G 18/32 | (2006.01) |
| C08G 18/76 | (2006.01) |
| C08K 3/04 | (2006.01) |
| C08K 3/36 | (2006.01) |
| C08L 7/00 | (2006.01) |
| C08L 9/06 | (2006.01) |
| C08L 75/04 | (2006.01) |

(52) U.S. Cl.
CPC ............ B60C 1/0016 (2013.01); C08G 18/10 (2013.01); C08G 18/3206 (2013.01); C08G 18/7621 (2013.01); C08K 3/04 (2013.01); C08K 3/36 (2013.01); C08L 7/00 (2013.01); C08L 9/06 (2013.01); C08L 75/04 (2013.01); *C08L 2205/03* (2013.01)

(58) Field of Classification Search
CPC .. B60C 1/0016; C08G 18/10; C08G 18/3206; C08G 18/7621; C08G 18/6208; C08K 3/04; C08K 3/36; C08L 7/00; C08L 9/06; C08L 75/04; C08L 2205/03
See application file for complete search history.

(56) References Cited

U.S. PATENT DOCUMENTS

| 3,432,451 A | 3/1969 | Kales et al. |
| 3,648,748 A | 3/1972 | Lovell |
| 3,882,191 A | 5/1975 | Balatoni et al. |
| 3,979,547 A | 9/1976 | Roberts, Jr. et al. |
| 4,131,149 A | 12/1978 | Roberts, Jr. et al. |
| 4,507,430 A | 3/1985 | Shimada et al. |
| 4,898,919 A | 2/1990 | Uedea et al. |
| 5,145,935 A | 9/1992 | Hayashi |
| 5,539,054 A | 7/1996 | LaFleur |
| 5,589,543 A | 12/1996 | Yokelson et al. |
| 5,710,192 A | 1/1998 | Hernandez |
| 5,780,551 A | 7/1998 | Enget et al. |
| 5,864,001 A | 1/1999 | Masse et al. |
| 5,925,724 A | 7/1999 | Cecens et al. |
| 5,955,559 A | 9/1999 | Handlin, Jr. et al. |
| 6,060,560 A | 5/2000 | St. Clair |
| 6,174,959 B1 | 1/2001 | Ciebien et al. |
| 6,207,752 B1 | 3/2001 | Abraham et al. |
| 6,251,982 B1 | 6/2001 | Masse et al. |
| 6,323,299 B1 | 11/2001 | Handlin et al. |
| 6,407,165 B1 * | 6/2002 | Wang ............... C08L 21/00 525/131 |
| 6,407,166 B1 * | 6/2002 | Wang ............... C08L 21/00 525/131 |
| 6,777,026 B2 | 8/2004 | Halladay et al. |
| 6,780,957 B1 | 8/2004 | Haider et al. |
| 7,999,036 B2 | 8/2011 | Nishioka et al. |
| 8,124,234 B2 | 2/2012 | Weaver et al. |

(Continued)

FOREIGN PATENT DOCUMENTS

| CN | 103270100 A | 8/2013 |
| EP | 0489216 A1 | 6/1992 |

(Continued)

OTHER PUBLICATIONS

Supplemental European Search Report from EP application 18889635, dated Jul. 2021.
Written Opinion from PCT application PCT/US2018065385, dated Apr. 2019.
International Search Report from PCT application PCT/US2018065385, dated Apr. 2019.
Sebenik, U., et al., "Modification of NR/BR blend With Unsaturated Thermoplastic Polyurethane; Polyurethane Synthesis, Blend Morphology, Vulcanization, and Vulcanizate Properties," E-Polymers, vol. 6(1), pp. 532-554 (2006).
Tan, J.H., et al., "Novel Blends of Acrylonitrile Butadiene Rubber and Polyurethane-Silica Hybrid Networks," Polymer Letters, vol. 6(7), pp. 588-600 (2012).

(Continued)

*Primary Examiner* — Andrew J. Oyer
(74) *Attorney, Agent, or Firm* — Meredith E. Hooker; Jenny L. Sheaffer

(57) ABSTRACT

Disclosed herein are tread rubber compositions containing a specified polyurethane, tires containing a tread made from the rubber compositions, and related methods of improving the wet and dry traction of a tire tread by using the polyurethane-containing rubber compositions. The polyurethane includes a saturated hydroxy-functionalized polydiene segment as diol.

17 Claims, No Drawings

(56) References Cited

U.S. PATENT DOCUMENTS

| | | |
|---|---|---|
| 8,404,780 B2 | 3/2013 | Weaver et al. |
| 2005/0267245 A1 | 12/2005 | Sandusky et al. |
| 2006/0276613 A1 | 12/2006 | Yilgor et al. |
| 2013/0345336 A1 | 12/2013 | Lopitaux |
| 2014/0142251 A1 | 5/2014 | Liang et al. |
| 2016/0237261 A1 | 8/2016 | Jia et al. |
| 2017/0361653 A1 | 12/2017 | Saintigny |

FOREIGN PATENT DOCUMENTS

| | | |
|---|---|---|
| EP | 2500185 A1 | 9/2012 |
| JP | 2001-026711 A | 1/2001 |
| JP | 2008-050571 A | 3/2008 |
| JP | 2008-280380 A | 11/2008 |
| WO | 03-076537 A1 | 9/2003 |
| WO | 2007-025690 A1 | 3/2007 |
| WO | 2016-109377 A1 | 7/2016 |

OTHER PUBLICATIONS

Amrollahi, M., et al., "Investigation of novel polyurethane elastomeric networks based on polybutadiene-ol/polypropyleneoxide mixture and their structure-properties relationship," Materials & Design, vol. 32(7), pp. 3933-3941 (2011).

Pichaiyut, S., et al., "Thermoplastic Elastomers-Based Natural Rubber and Thermoplastic Polyurethane Blends," Iranian Polymer Journal, vol. 21(1), pp. 65-79 (2012).

Li, F., et al., "Polyurethane/Conducting Carbon Black Composites: Structure, Electric Conductivity, Strain Recovery Behavior, and Their Relationships," Journal of Applied Polymer Science, vol. 75(1), pp. 68-77 (2000).

Li, F., et al., "Studies on Thermally Stimulated Shape Memory Effect of Segmented Polyurethanes," Journal of Applied Polymer Science, vol. 64(8), pp. 1511-1516 (1997).

Yang, B., et al., "Effects of Moisture on the Glass Transition Temperature of Polyurethane Shape Memory Polymer Filled With Nano-Carbon Powder," European Polymer Journal, vol. 41(5), pp. 1123-1128 (2005).

Yang, B., et al., "Effects of Moisture on the Thermomechanical Properties of a Polyurethane Shape Memory Polymer," Polymer, vol. 47(4), pp. 1348-1356 (2006).

Huang, W.M., et al., "Thermo-moisture responsive polyurethane shape-memorypolymer and composites: a review," Journal of Materials Chemistry, vol. 20, pp. 3367-3381 (2010).

Huang, W.M., et al., "Water-Driven Programmable Polyurethane Shape Memory Polymer: Demonstration and Mechanism," Applied Physics Letters, vol. 86, p. 114105 (2005).

Tobushi, H., et al., "Influence of Strain-Holding Conditions on Shape Recovery and Secondary-Shape Forming in Polyurethane-Shape Memory Polymer," Smart Materials and Structures, vol. 15, pp. 1033-1038 (2006).

Krishnan, P.S.G., et al., "Hydroxy Terminated Polybutadiene: Chemical Modifications and Applications," Journal of Macromolecular Science Part A, vol. 50(1), pp. 128-138 (2013).

Prisacariu, Cristina, "Polyurethane Elastomers: From Morphology to Mechanical Aspects," Springer, copyright 2011.

Cray Valley Product Bulletin, "Hydroxyl-Terminated Polybutadiene Resins and Derivatives," Oct. 2016.

Cray Valley Application Bulletin, "Novel Polybutadiene Diols for Thermoplastic Polyurethanes," Jan. 2010.

\* cited by examiner

POLYURETHANE-CONTAINING TREAD RUBBER COMPOSITIONS AND RELATED METHODS

This application is a national stage application of PCT/US2018/065385 filed on Dec. 13, 2018, which claims the benefit of U.S. Provisional Application Ser. No. 62/599034 filed on Dec. 15, 2017, which are incorporated herein by reference in their entirety.

FIELD

The present application is directed to tread rubber compositions which contain a specified polyurethane, to tires containing a tread made from the rubber compositions, and to related methods of improving the wet and dry traction of a tire tread by using the polyurethane-containing rubber compositions.

BACKGROUND

Rubber compositions which are prepared for use in tire treads often contain one or more oils, which are frequently referred to as processing oils because of their beneficial properties during mixing of one or more rubbers with reinforcing fillers.

SUMMARY

Disclosed herein are tread rubber compositions containing a specified polyurethane, tires containing a tread made from the rubber compositions, and related methods of improving the wet and dry traction of a tire tread by using the polyurethane-containing rubber compositions. As discussed further herein, the polyurethane can function as a complete or partial replacement for the oil traditionally used in tire tread rubber compositions.

According to the first embodiment disclosed herein, a tread rubber composition is disclosed which comprises (a) 100 parts of at least one conjugated diene containing polymer or copolymer; (b) 20 to 200 phr of at least one carbon black filler, at least one silica filler, or a combination thereof; and (c) 1 to 40 phr of at least one polyurethane including a saturated hydroxy-functionalized polydiene segment as diol, wherein the rubber composition contains no more than 15 phr of oil.

According to the second embodiment disclosed herein, a tire is disclosed which contains a tread made from a rubber composition comprising (a) 100 parts of at least one conjugated diene containing polymer or copolymer; (b) 20 to 200 phr of at least one carbon black filler, at least one silica filler, or a combination thereof; and (c) 1 to 40 phr of at least one polyurethane including a saturated hydroxy-functionalized polydiene segment as diol, wherein the rubber composition contains no more than 15 phr of oil.

According to the third embodiment disclosed herein, a method is provided for improving the wet and dry traction of a tire tread. The method comprises: incorporating 1 to 40 phr of at least one polyurethane including a saturated hydroxy-functionalized polydiene segment as diol into a rubber composition comprising: 100 parts of at least one conjugated diene containing polymer or copolymer; 20 to 200 phr of at least one carbon black filler, at least one silica filler, or a combination thereof; and no more than 15 phr of oil, wherein the resulting tire tread has an increase in both wet traction and dry traction, together with either: (a) an increase in rolling resistance of no more than 50% of the average increase in wet and dry traction, or (b) a decrease in rolling resistance, the relative increases or decreases being as compared to a tire tread made from a rubber composition lacking the polyurethane.

DETAILED DESCRIPTION

Disclosed herein are tread rubber compositions containing a specified polyurethane, tires containing a tread made from the rubber compositions, and related methods of improving the wet and dry traction of a tire tread by using the polyurethane-containing rubber compositions.

According to the first embodiment disclosed herein, a tread rubber composition is disclosed which comprises (a) 100 parts of at least one conjugated diene containing polymer or copolymer; (b) 20 to 200 phr of at least one carbon black filler, at least one silica filler, or a combination thereof; and (c) 1 to 40 phr of at least one polyurethane including a saturated hydroxy-functionalized polydiene segment as diol, wherein the rubber composition contains no more than 15 phr of oil.

According to the second embodiment disclosed herein, a tire is disclosed which contains a tread made from a rubber composition comprising (a) 100 parts of at least one conjugated diene containing polymer or copolymer; (b) 20 to 200 phr of at least one carbon black filler, at least one silica filler, or a combination thereof; and (c) 1 to 40 phr of at least one polyurethane including a saturated hydroxy-functionalized polydiene segment as diol, wherein the rubber composition contains no more than 15 phr of oil.

According to the third embodiment disclosed herein, a method is provided for improving the wet and dry traction of a tire tread. The method comprises: incorporating 1 to 40 phr of at least one polyurethane including a saturated hydroxy-functionalized polydiene segment as diol into a rubber composition comprising: 100 parts of at least one conjugated diene containing polymer or copolymer; 20 to 200 phr of at least one carbon black filler, at least one silica filler, or a combination thereof; and no more than 15 phr of oil, wherein the resulting tire tread has an increase in both wet traction and dry traction, together with either: (a) an increase in rolling resistance of no more than 50% of the average increase in wet and dry traction, or (b) a decrease in rolling resistance, the relative increases or decreases being as compared to a tire tread made from a rubber composition lacking the polyurethane.

Definitions

The terminology as set forth herein is for description of the embodiments only and should not be construed as limiting the invention as a whole.

Unless otherwise indicated herein, the term "Mooney viscosity" refers to the compound Mooney viscosity, $ML_{1+4}$. As those of skill in the art will understand, a rubber composition's Mooney viscosity is measured prior to vulcanization or curing.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of a particulate material, including but not limited to the carbon black and "non-reinforcing fillers" of particulate material discussed herein. The nitrogen surface area can be determined by various standard methods including those mentioned below.

As used herein, the term "phr" means parts per one hundred parts rubber.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

Polyurethane

Generally, the polyurethanes referred to herein can be understood as being comprised of (or formed from) a diol component and an isocyanate component. As discussed above, the first-third embodiments disclosed herein include 1 to 40 phr (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 phr) of at least one polyurethane including a saturated hydroxy-functionalized polydiene segment as diol. According to the first-third embodiments, one or more than one polyurethane including a saturated hydroxy-functionalized polydiene segment as diol can be present. In certain embodiments of the first-third embodiments, 2 to 30 phr (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30 phr), or 5 to 20 phr (e.g., 5, 6, 7, 8, 9, 10, 11, 12, 13, 14, 15, 16, 17, 18, 19, or 20 phr) of at least one polyurethane including a saturated hydroxy-functionalized polydiene segment as diol is utilized in the tread rubber composition. In certain embodiments of the first-third embodiments, the polyurethane is present in the rubber composition in an amount of less than 10% (e.g., 9%, 8%, 7%, 6%, 5%, 4%, 3%, 2%, 1% or less) by weight (based upon the overall weight of the rubber composition).

According to the first-third embodiments disclosed herein, the weight average molecular weight (Mw), the number average molecular weight (Mn) and the polydispersity or Mw/Mn of the at least one polyurethane may vary. In certain embodiments of the first-third embodiments, the polyurethane has a Mw of 90,000 to 150,000 grams/mole (e.g., 90,000; 95,000; 100,000; 105,000; 110,000; 115,000; 120,000; 125,000; 130,000; 135,000; 140,000; 145,000; or 150,000 grams/mole). In other embodiments of the first-third embodiments, the polyurethane has a Mw of 100,000 to 140,000 grams/mole or 105,000 to 120,000 grams/mole. In certain embodiments of the first-third embodiments, the polyurethane has a Mn of 10,000 to 50,000 grams/mole (e.g., 10,000; 15,000; 20,000; 25,000; 30,000; 35,000; 40,000; 45,000; or 50,000 grams/mole). In other embodiments of the first-third embodiments, the polyurethane has a Mn of 10,000 to 40,000 grams/mole or 15,000 to 40,000 grams/mole. In certain embodiments of the first-third embodiments, the polyurethane has a Mw/Mn of 2 to 10 (e.g., 2, 2.5, 3, 3.5, 4, 4.5, 5, 5.5, 6, 6.5, 7, 7.5, 8, 8.5, 9, 9.5, or 10). In other embodiments of the first-third embodiments, the polyurethane has a Mw/Mn of 3 to 8 (e.g., 3, 3.5, 4, 4.5, 5, 5.5, 6, 6.5, 7, 7.5, or 8). In certain embodiments of the first-third embodiments, the polyurethane has a Mw, Mn, and Mw/Mn according to one of the ranges or values discussed above. As a non-limiting example, in certain embodiments of the first-third embodiments, the polyurethane has a Mw of 90,000 to 150,000 grams/mole, a Mn of 10,000 to 50,000 grams/mole; and a Mw/Mn of 2 to 10.

According to the first-third embodiments disclosed herein, the amount of saturated hydroxy-functionalized polydiene segment present in the polyurethane may vary. In certain embodiments of the first-third embodiments disclosed herein, the saturated hydroxy-functionalized polydiene segment constitutes a minority by weight (e.g., 49% or less, 40% or less, 35% or less, 30% or less, 25% or less, 20% or less, 15% or less, or 10% or less) of the overall polyurethane. In preferred embodiments of the first-third embodiments disclosed herein, the portion of the polyurethane which is contributed by a component other than the saturated hydroxy-functionalized polydiene segment component (e.g., isocyanate(s) and any chain extender(s)) comprises at least 50%, at least 60%, at least 70%, at least 75%, at least 80%, at least 85%, or at least 90% by weight of the saturated hydroxy-functionalized polydiene segment. In certain embodiments of the first-third embodiments disclosed herein, the 5-49% by weight (e.g., 70%, 75%, 80%, 82.5%, 85%, 87.5%, 90%, 92.5%, or 95%), 5-40%, 5-30%, or 5-20% of the polyurethane constitutes the saturated hydroxy-functionalized polydiene segment.

According to the first-third embodiments disclosed herein, the amount of isocyanate present in the polyurethane may vary, but is generally a minority by weight (i.e., less than 50% by weight). In preferred embodiments of the first-third embodiments disclosed herein, the polyurethane comprises no more than 30%, no more than 25%, no more than 20%, no more than 15%, no more than 10%, or no more than 5% by weight of isocyanate. In certain embodiments of the first-third embodiments disclosed herein, the polyurethane comprises 5-30% by weight (e.g., 5%, 10%, 12.5%, 15%, 17.5%, 20%, 22.5%, or 25%), 10-25% by weight, or 10-20% by weight of isocyanate.

According to the first-third embodiments disclosed herein, the amount of chain extender present in the polyurethane may vary, but is generally a small amount such as 20% by weight or less. In preferred embodiments of the first-third embodiments, the polyurethane comprises no more than 15%, no more than 12.5%, no more than 10%, no more than 7.5%, no more than 5%, no more than 2.5%, no more than 2%, no more than 1%, or even 0% by weight of chain extender. In certain embodiments of the first-third embodiments disclosed herein, the polyurethane comprises 1-20% by weight, 1-10% by weight, or 1-5% by weight of chain extender.

According to the first-third embodiments, the Tg of the polyurethane may vary. In certain embodiments of the first-third embodiments, the polyurethane has a Tg of −40 to −20° C. (e.g., −40, −38, −36, −34, −32, −30, −28, −26, −24, −22, or −20° C.). Generally, the at least one polyurethane used in the rubber compositions of the first-third embodiments will be a liquid (often a viscous liquid) at room temperature (23° C.). Preferably, the polyurethane(s) used in the rubber compositions of the first-third embodiments is/are not a foam.

The at least one polyurethane including a saturated hydroxy-functionalized polydiene segment which is utilized in the rubber compositions of the first-third embodiment is preferably a thermoset polyurethane as opposed to a thermoplastic polyurethane. Thermoset polyurethanes may also be referred to as cast polyurethanes.

Saturated Hydroxy-Functionalized Polydiene

As discussed above, according to the first-third embodiments, the at least one polyurethane includes a saturated hydroxy-functionalized polydiene as its diol component. The saturated hydroxy-functionalized polydiene can also be considered to constitute a segment of the polyurethane. The saturated hydroxy-functionalized polydiene segment may be made from (polymerized using) at least one $C_4$ to $C_{10}$ diene (e.g., 4 carbon atoms, 5 carbon atoms, 6 carbon atoms, 7 carbon atoms, 8 carbon atoms, 9 carbon atoms, or 10 carbon atoms), preferably at least one $C_4$ to $C_6$ diene (e.g., 4 carbon atoms, 5 carbon atoms, or 6 carbon atoms). In certain embodiments of the first-third embodiments, the diene is a conjugated diene having 4 to 10 carbons (e.g., 4 carbon atoms, 5 carbon atoms, 6 carbon atoms, 7 carbon atoms, 8 carbon atoms, 9 carbon atoms, or 10 carbon atoms). The particular conjugated diene or conjugated dienes may vary, as discussed further herein. In certain embodiments of the first-third embodiments, the saturated hydroxy-functionalized polydiene segment is made from butadiene, preferably 1,3-butadiene. By stating that the hydroxy-functionalized polydiene is saturated is meant that at least 90% (e.g., 90%, 91%, 92%, 93%, 94%. 95%, 96%, 97%, 98%, 99%, or 100%) of the double bonds within the polydiene have been saturated. In certain preferred embodiments of the first-third embodiments, the saturated hydroxy-functionalized polydiene segment has had at least 95% (e.g., 95%, 96%, 97%, 98%, 99%, or 100%) of its double bonds saturated. Saturated bonds can be understood as involving carbon atoms which are each bonded to a total of four other atoms (generally either hydrogen or another carbon). Generally, according to the first-third embodiments, saturation of the hydroxy-functionalized polydiene is achieved by hydrogenation.

The total number of hydroxy groups present in the saturated hydroxy-functionalized polydiene segment used in the polyurethane component of the first-third embodiments may vary. In certain embodiments of the first-third embodiments, the saturated hydroxy-functionalized polydiene segment of the polyurethane has a number average of 1.6 to 2 terminal hydroxy groups per molecule (e.g., 1.6, 1.7, 1.8, 1.9, or 2). In certain embodiments of the first-third embodiments, the saturated hydroxy-functionalized polydiene segment of the polyurethane has a number average of 1.8 to 2 terminal hydroxy groups per molecule, or 1.9 to 2 terminal hydroxy groups per molecule.

According to the first-third embodiments, the number average molecular weight or Mn of the saturated hydroxy-functionalized polydiene segment of the polyurethane may vary. In certain embodiments of the first-third embodiments, the Mn of the saturated hydroxy-functionalized polydiene segment is 500 to 20,000 grams/mole (e.g., 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500 or 20000 grams/mole). In certain embodiments of the first-third embodiments, the Mn of the saturated hydroxy-functionalized polydiene segment is 1,000 to 10,000 grams/mole (e.g., 500, 600, 700, 800, 900, 1000, 1500, 2000, 2500, 3000, 3500, 4000, 4500, 5000, 5500, 6000, 6500, 7000, 7500, 8000, 8500, 9000, 9500, or 10000 grams/mole).

According to the first-third embodiments, the weight average molecular weight or Mw of the saturated hydroxy-functionalized polydiene segment of the polyurethane may vary. In certain embodiments of the first-third embodiments, the Mw of the saturated hydroxy-functionalized polydiene segment is 500 to 20,000 grams/mole (e.g., 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500 or 20000 grams/mole).

In certain embodiments of the first-third embodiments, the Mw of the saturated hydroxy-functionalized polydiene segment is 1,000 to 5,000 grams/mole (e.g., 1000, 1500, 2000, 2500, 3000, 3500, 4000, 4500, or 5000 grams/mole).

The saturated hydroxy-functionalized polydiene segment or portion of the polyurethane used in the first-third embodiments may be prepared by polymerizing one or more dienes (as discussed above) by various methods (including, but not limited to anionic polymerization), followed by hydrogenating the resulting polydiene to produce the saturation, as discussed above. Certain saturated hydroxy-functionalized polydienes suitable for use in preparing the polyurethanes used in the first-third embodiments are commercially available from companies such as Cray Valley (operating as Total Cray Valley in the United States) under the tradename Krasol® (e.g., Krasol® HLBH-P 2000, Krasol® HLBH-P 3000).

Isocyanate

As mentioned above, the polyurethanes referred to herein can be understood as being comprised of (or formed from) an isocyanate component, in addition to the saturated hydroxy-functionalized polydiene segment discussed above. According to the first-third embodiments, one or more than one type of isocyanate can be utilized (or present in) the isocyanate component of the polyurethane. The isocyanate may be aliphatic or aromatic. In preferred embodiments of the first-third embodiments, the isocyanate component of the polyurethane is aromatic. In other embodiments of the first-third embodiments, the isocyanate component is aliphatic or includes an aliphatic isocyanate. In certain embodiments of the first-third embodiments, the isocyanate component of the polyurethane is an aromatic diisocyanate selected from the group consisting of 4,4'-diphenylmethane diisocyanate, toluene diisocyanate, isophorone diisocyanate, hexamethylene diisocyanate, ethylene diisocyanate, paraphenyl diisocyanate, and combinations thereof. In certain embodiments of the first-third embodiments, the isocyanate component of the polyurethane comprises toluene diisocyanate. In certain embodiments of the first-third embodiments, the only isocyanate component used in (or present in) the polyurethane is toluene diisocyanate. Exemplary aliphatic isocyanates include, but are not limited to, hexamethylene diisocyanate (HDI), methylene dicyclohexyl diisocyanate (MDI), hydrogenated methylene dicyclohexyl diisocyanate (HMDI), isophorone diisocyanate (IPDI), Chain Extender In certain embodiments of the first-third embodiments disclosed herein, the polyurethane includes (further comprises) at least one chain extender. In other embodiments of the first-third embodiments, the polyurethane contains no chain extender. In those embodiments of the first-third embodiments wherein the polyurethane includes (further comprises) at least one chain extender, the particular chain extender or extenders utilized may vary. In preferred embodiments of the first-third embodiments, the chain extender comprises a diol having 2 to 20 carbon atoms (e.g., 2, 3, 4, 5, 6, 7, 8, 9, 10, 11, 12, 13, 14, 15, 16, 17, 18, 19 or 20 carbon atoms), preferably 2 to 10 carbon atoms, even more preferably 2 to 6 carbon atoms. Generally, the chain extender may be either aliphatic or aromatic. In preferred embodiments of the first-third embodiments, any chain extender utilized is aliphatic. Non-limiting examples of aliphatic diols include ethylene glycol, 1,4-butanediol, and 1,6-hexanediol. Non-limiting examples of aromatic diols include those based upon terephthalic acid including diesters of terephthalic acid with diols having 2-4 carbon atoms.

Tread Rubber Composition

As discussed above, the first and second embodiments disclosed herein are directed to a tread rubber composition and to a tire containing a tread made from a rubber composition including specified ingredients. According to the second embodiment, the rubber composition of the tread of the tire can be understood to be a tread rubber composition. As also discussed above, the third embodiment disclosed herein is directed to a method for improving the wet and dry traction of a tire tread and the overall composition of the tire tread can also be understood to be a tread rubber composition. Thus, each of the first-third embodiments disclosed herein can be understood as including a tread rubber composition of specified ingredients.

According to the first-third embodiments, the tread rubber composition includes at least one polyurethane (as discussed above), as well as 100 parts of at least one conjugated diene-containing polymer or copolymer; 20-200 phr of at least one carbon black filler, at least one silica filler, or a combination thereof; and no more than 15 phr of oil. The polymer/copolymer components, filler component, oil component, as well as other optional ingredients of the tread rubber composition are discussed in more detail below.

Polymer or Copolymer Component

As mentioned above, the tread rubber composition of the first-third embodiments includes 100 parts of at least one conjugated diene-containing polymer or copolymer. In other words, one or more than one conjugated diene-containing polymer or copolymer may be utilized in the tread rubber composition and the total amount of all such polymer(s) and/or copolymer(s) is 100 parts (or 100 phr). According to the first-third embodiments disclosed herein, the 100 parts of at least one conjugated diene-containing polymer or copolymer can also be referred to as the rubber component of the tread rubber composition. In certain preferred embodiments of the first-third embodiments, the 100 parts of at least one conjugated diene-containing polymer or copolymer is selected from the group consisting of polybutadiene, styrene-butadiene copolymer, natural rubber, polyisoprene, styrene-butadiene-isoprene rubber, isoprene-butadiene rubber, and combinations thereof.

Reference herein to a conjugated diene-containing polymer or copolymer is meant to refer to the monomer(s) used to prepare the polymer or copolymer. Accordingly, the conjugated diene-containing polymer or copolymers utilized in the tread rubber composition include at least one conjugated diene monomer. In certain embodiments of the first-third embodiments, the conjugated diene-containing polymer utilizes only at least one conjugated diene monomer (i.e., as the only type of monomer). In certain embodiments of the first-third embodiments, the conjugated diene-containing copolymer includes at least one conjugated diene monomer and at least one vinyl aromatic monomer (i.e., the at least one vinyl aromatic monomer is present). In certain embodiments of the first-third embodiments, the conjugated diene-containing copolymer consists of at least one conjugated diene monomer and at least one vinyl aromatic monomer (i.e., as the only type of monomers). According to the first-third embodiments, one or more than one type of conjugated diene monomer may be utilized in the conjugated diene-containing polymer or copolymer. Similarly, according to the first-third embodiments, when at least one vinyl aromatic monomer is present in the conjugated diene-containing copolymer, one or more than one type of vinyl aromatic monomer may be utilized.

As those of skill in the art understand, a conjugated diene is a compound that has two double carbon-carbon bonds (i.e., two —C=C— bonds) that are separated by a single bond (i.e., —C—C—); a conjugated diene will contain at least one —C=C—C=C— moiety). The particular structure of the conjugated diene monomer present in the conjugated diene-containing polymer or copolymer used in the tread rubber compositions of the first-third embodiments disclosed herein can vary. Non-limiting examples of suitable conjugated diene monomers for use in the embodiments of the first-third embodiments disclosed herein include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and combinations thereof. In certain embodiments of the first-third embodiments disclosed herein, the conjugated diene monomer comprises or is 1,3-butadiene. In certain embodiments of the first-third embodiments disclosed herein, the conjugated diene monomer consists of 1,3-butadiene (i.e., the only conjugated diene monomer utilized is 1,3-butadiene; in certain such embodiments, the conjugated diene-containing polymer is polybutadiene.

As mentioned above, in certain embodiments of the first-third embodiments, the conjugated diene-containing polymer or copolymer contains at least one vinyl aromatic monomer in addition to the at least one conjugated diene monomer and, thus, is a copolymer. In those embodiments of the first-third embodiments disclosed herein wherein at least one type of vinyl aromatic monomer is present in the conjugated diene-containing copolymer, the at least one vinyl aromatic monomer may comprise at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one type of vinyl aromatic monomer comprises styrene. In certain embodiments of the first-third embodiments, the vinyl aromatic monomer consists of styrene (i.e., the only vinyl aromatic monomer utilized is styrene). In certain embodiments of the first-third embodiments wherein the at least one conjugated diene-containing copolymer utilizes at least one conjugated diene monomer in combination with at least one type of vinyl aromatic monomer, they are utilized at a weight ratio of 95:5 to 50:50 (e.g., 95-50% conjugated diene monomer and 5-50% vinyl aromatic monomer), including 95:5 to 65:35. In certain embodiments of the first-third embodiments wherein the at least one conjugated diene-containing copolymer utilizes a combination of 1,3-butadiene and styrene monomers, the styrene content of the polymer chains is about 10 to about 50% (e.g., 10%, 15%, 20%, 25%, 30%, 35%, 40%, 45%, 50%) by weight of the total monomer content (i.e., 1,3-butadiene+styrene), including 10-50% by weight, about 18 to about 40% by weight, and 18-40% by weight. In certain embodiments of the first-third embodiments wherein the at least one conjugated diene-containing copolymer contains a combination of 1,3-butadiene and styrene as monomers, the polymer chains have a microstructure with about 8 to about 99% by mass vinyl bonds (1,2-vinyl) in the butadiene portion, including 8-99% (e.g., 8%, 10%, 15%, 20%, 25%, 30%, 35%, 40%, 45%, 50%, 55%, 60%, 65%, 70%, 80%, 85%, 90%, 95%, 99%), about 10 to about 60% and 10-60% by weight. The vinyl bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

Filler Component

As discussed above, the tread rubber compositions of the first-third embodiments include (comprise) 20 to 200 phr (e.g., 20, 30, 40, 50, 60, 70, 80, 90, 100, 110, 120, 130, 140, 150, 160, 170, 180, 190 or 200 phr) of at least one carbon black filler, at least one silica filler, or a combination thereof. In other words, the tread rubber compositions may include one carbon black filler in an amount of 20-200 phr, more than one carbon black filler in a total amount of 20-200 phr, one silica filler in an amount of 20-200 phr, more than one silica filler in a total amount of 20-200 phr, one carbon black filler and one silica filler in a total amount of 20-200 phr, more than one carbon black filler and one silica filler in a total amount of 20-200 phr, one carbon black filler and more than one silica filler in a total amount of 20-200 phr, or more than one carbon black filler and more than one silica filler in a total amount of 20-200 phr. In certain embodiments of the first-third embodiments, the tread rubber composition comprises 50 to 200 or 90 to 200 phr of at least one carbon black filler, at least one silica filler, or a combination thereof. Preferably, according to the first-third embodiments, the 20-200 phr of at least one filler includes at least one reinforcing filler. As discussed in more detail below, reinforcing fillers include, but are not limited to, certain grades of carbon black and silica.

As discussed above, in certain embodiments of the first-third embodiments disclosed herein the tread rubber composition includes at least one silica filler, preferably at least one reinforcing silica filler. One or more than one silica filler may be utilized. Suitable silica fillers, including reinforcing silica fillers, for use in certain embodiments of the first-third embodiments are well known. Non-limiting examples of reinforcing silica fillers suitable for use in certain embodiments of the first-third embodiments include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the first-third embodiments include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the tread rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the tread rubber composition comprises reinforcing silica filler having a pH of about 5.5 to about 7 or slightly over 7, preferably about 5.5 to about 6.8. Some of the commercially available reinforcing silica fillers which can be used in certain embodiments of the third embodiment include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165 MP), and J. M. Huber Corporation.

In certain embodiments of the first-third embodiments disclosed herein, when the at least one reinforcing filler includes silica filler, one or more than one silica coupling agent may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the first-third embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the first-third embodiments disclosed herein, silica filler is present and a mercapto silica coupling agent is used. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^{10}_p Si(OR^{11})_{4-p}$ where each $R^{11}$ is independently a monovalent organic group, and p is an integer from 1 to 3, with the proviso that at least one $R^{10}$ is an alkyl group. Preferably p is 1. Generally, each $R^{10}$ independently comprises $C_1$ to $C_{20}$ aliphatic, $C_5$ to $C_{20}$ cycloaliphatic, or $C_6$ to $C_{20}$ aromatic; and each $R^{11}$ independently comprises $C_1$ to $C_6$ aliphatic. In certain exemplary embodiments, each $R^{10}$ independently comprises $C_6$ to $C_{15}$ aliphatic and in additional embodiments each Ft' independently comprises $C_8$ to $C_{14}$ aliphatic. Mercapto silanes have the general formula $HS-R^{13}-Si(R^{14})(R^{15})_2$ where $R^{13}$ is a divalent organic group, $R^{14}$ is a halogen atom or an alkoxy group, each $R^{15}$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^{16}-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^{16}$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the first-third embodiments include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, di methyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the first-third embodiments include bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl) disulfide, 3,3'-bis(trimethoxysilylpropyl) disulfide, 3,3'-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilyl propyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the first-third embodiments include, but are not limited to, bis(3-triethoxysilylpropyl) tetrasulfide, bis(2-triethoxysilylethyl) tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the first-third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the first-third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica. Coupsil 6508, Agilon 400™ silica from PPG Industries, Agilon 454° silica from PPG Industries, and 458° silica from PPG Industries. In those embodiments where the silica comprises a pre-treated silica, the pre-treated silica is used in an amount as previously disclosed for the silica filler (i.e., 20 to 200 phr, etc.).

When a silica coupling agent is utilized in an embodiment of the first-third embodiments, the amount used may vary. In certain embodiments of the first-third embodiments, the rubber compositions do not contain any silica coupling agent. In other embodiments of the first-third embodiments, the silica coupling agent is present in an amount sufficient to provide a ratio of the total amount of silica coupling agent to silica filler of about 0.1:100 to about 1:5 (i.e., about 0.1 to about 20 parts by weight per 100 parts of silica), including 0.1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments, the rubber composition comprises about 0.1 to about 10 phr silica coupling agent, including 0.1 to 10 phr, about 0.1 to about 5 phr, 0.1 to 5 phr, about 0.1 to about 3 phr, and 0.1 to 3 phr.

As discussed above, in certain embodiments of the first-third embodiments disclosed herein the tread rubber composition includes at least one carbon black filler, preferably at least one reinforcing carbon black filler. One or more than one reinforcing carbon black filler can be utilized. As discussed in more detail below, most carbon blacks are commonly understood to be reinforcing fillers. In certain embodiments of the first-third embodiments, the tread rubber composition comprises carbon black in an amount of from zero to about 50% by weight of the total reinforcing filler, including zero to 50% (e.g., 0 phr to 100 phr, including 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr and 100 phr), about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the first-third embodiments, the carbon black comprises no more than about 30% by weight (including no more than 30% by weight) of the total reinforcing filler in the tread rubber composition. In certain embodiments of the first-third embodiments, the tread rubber composition comprises about 5 to about 100 phr (including 5 to 100 phr) of one or more carbon blacks.

Generally, suitable carbon blacks for use as a reinforcing filler in the rubber composition of certain embodiments of the first-third embodiments include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments, the tread rubber composition includes a mixture of two or more of the foregoing blacks. Typical suitable carbon blacks for use in certain embodiments of the first-third embodiments are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

In certain embodiments of the first-third embodiments, the tread rubber composition includes at least one reinforcing filler other than carbon black or silica (i.e., an additional reinforcing filler). One or more than one additional reinforcing filler may be utilized. In certain embodiments of the first-third embodiments, the tread rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the tread rubber compositions of certain embodiments of the first-third embodiment are well known. Non-limiting examples of suitable additional reinforcing fillers for use in the tread rubber compositions of certain embodiments of the first-third embodiment include, but are not limited to, alumina, aluminum hydroxide, clay (reinforcing grades), magnesium hydroxide, boron nitride, aluminum nitride, titanium dioxide, reinforcing zinc oxide, and combinations thereof.

In certain embodiments of the first-third embodiments, the tread rubber composition is essentially free of clay filler. By essentially free of clay filler is meant that the rubber composition includes no more than 10 phr of clay filler, preferably no more than 5 phr of clay filler, even more preferably 0 phr of clay filler.

In certain embodiments of the first-third embodiments, the tread rubber composition further comprises at least one of the following non-reinforcing fillers: clay (non-reinforcing grades), graphite, magnesium dioxide, aluminum oxide, starch, boron nitride (non-reinforcing grades), silicon nitride, aluminum nitride (non-reinforcing grades), calcium silicate, and silicon carbide. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments, the term "non-reinforcing filler" is alternatively or additionally used to refer to a particulate material that has a particle size of greater than about 1000 nm (including less than 1000 nm).

Oil Component

As discussed above, the tread rubber compositions of the first-third embodiments contains no more than 15 phr of oil (e.g., 15, 14, 13, 12, 11, 10, 9, 8, 7, 6, 5, 4, 3, 2, 1, or 0 phr), preferably no more than 10 phr of oil or even no more than 5 phr of oil. In certain embodiments of the first-third embodiments, the tread rubber composition contains 0 phr of oil. Reducing or minimizing the amount of oil present in the tread rubber compositions of the first-third embodiments can eliminate or at least reduce the risk of oil migration out of the tread rubber composition into other tire components.

As used herein, the term oil is meant to encompass both processing oil and extending oil. Various types of processing and extender oils are known for utilization in tire tread rubber compositions, including, but not limited to aromatic, naphthenic, and low PCA oils (petroleum-sourced or plant-sourced. Low PCA oils generally have a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Exemplary low PCA oils are mild extraction solvates (MES), treated distillate aromatic extracts (TDAE), TRAE, and heavy naphthenics. Exemplary MES oils include CATENEX SNR from SHELL, PROREX 15, and FLEXON 683 from EXXON MOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Exemplary TDAE oils include TYREX 20 from EXXON-MOBIL, VIVATEC 500, VIVATEC 180, and ENERTHENE 1849 from BP, and EXTENSOIL 1996 from REPSOL. Exemplary heavy naphthenic oils include SHELLFLEX 794, ERGON BLACK OIL, ERGON H2000, CROSS C2000, CROSS C2400, and SAN JOAQUIN 2000L. Low PCA oils include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil.

Other Ingredients

In certain embodiments of the first-third embodiments disclosed herein, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the first-third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Additional ingredients that may be employed in certain embodiments (i.e., are optional) of the first-third embodiments are known to those of skill in the art and include oils (processing and extender), waxes, processing aids, antioxidants, tackifying resins, reinforcing resins, peptizers, and the components of a cure package.

In certain embodiments of the first-third embodiments, the tread rubber composition comprises about 5 to about 60 phr (e.g., 5, 10, 15, 20, 25, 30, 35, 40, 45, 50, 55, or 60 phr), 5 to 60 phr, 5 to 20 phr, about 25 to about 60 phr, 25 to 60 phr, or 30 to 50 phr of at least one resin; in certain such embodiments the at least one resin is a plasticizing resin. As used herein, the term plasticizing resin refers to a compound that is solid at room temperature (23° C.) and is miscible in the rubber composition at the amount used which is usually at least 5 phr. Generally, the plasticizing resin will act as a diluting agent and can be contrasted with tackifying resins which are generally immiscible and may migrate to the surface of a rubber composition providing tack. In certain embodiments of the third embodiment, wherein a plasticizing resin is utilized, it comprises a hydrocarbon resin and may be aliphatic type, aromatic type or aliphatic/aromatic type depending on the monomers contained therein. Examples of suitable plasticizing resins for use in the tread rubber compositions of the first-third embodiment include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins.

Such resins may be used, for example, individually or in combination. In certain embodiments of the first-third embodiments, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mw/Mn and Mw is the weight-average molecular weight of the resin. Tg of the resin can be measured by DSC (Differential Scanning calorimetry) according to ASTM D3418 (1999). Mw, Mn and PI of the resin may be determined by size exclusion chromatography (SEC), using THF, 35° C.; concentration 1 g/1; flow rate 1 milliliters/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

In certain embodiments of the first-third embodiments, the tread rubber composition comprises tackifying resin in an amount of 1 to 15 phr, 1 to 10 phr, or 1 to 5 phr. Exemplary tackifying resins include but are not limited to: rosin and its derivatives, hydrocarbon resins, and phenol-formaldehyde resins. One or more than one type as well as one or more than one of tackifying resin may be utilized in certain embodiments of the first-third embodiments. The tackifying resin will generally be solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols.

Various antioxidants are known to those of skill in the art and may be utilized in the tread rubber compositions of certain embodiments of the first-third embodiments; these include but are not limited to certain waxes, phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first-third embodiments. In certain embodiments of the first-third embodiments, the total amount of antioxidant(s) used is 1 to 5 phr.

Tires

As discussed above, the second embodiment disclosed herein is directed to a tire containing a tread made from a rubber composition according to the first embodiment. In other words, the tread is made from a rubber composition comprising: (a) 100 parts of at least one conjugated diene containing polymer or copolymer; (b) 20 to 200 phr of at least one carbon black filler, at least one silica filler, or a combination thereof; and (c) 1 to 40 phr of at least one polyurethane including a saturated hydroxy-functionalized polydiene segment as diol, wherein the rubber composition contains no more than 15 phr of oil.

As mentioned above, the rubber composition of the tread of the tire of the second embodiment contains no more than 15 phr of oil (e.g., 15, 14, 13, 12, 11, 10, 9, 8, 7, 6, 5, 4, 3, 2, 1, or 0 phr), preferably no more than 10 phr of oil or no more than 5 phr of oil (e.g., 5, 4.5, 4, 3.5, 3, 2.5, 2, 1.5, 1, 0.5, or 0 phr). In certain embodiments of the second embodiment, the tread rubber composition contains 0 phr of oil.

The ingredients used in preparing the rubber composition for the tread of the tire of the second embodiment may vary in accordance with the discussion infra of the ingredients of tread rubber composition of the first embodiment. Thus, the ingredients discussed elsewhere in this application should be interpreted to be fully applicable to embodiments of the tire of the second embodiment as if fully set forth in this section. Similarly, the properties of the tire tread of the second embodiment, including wet traction, dry traction, rolling resistance, etc., may vary in accordance with the discussion infra of such properties of the method of the third embodiment. Thus, the properties discussed elsewhere in this application should be interpreted to be fully applicable to embodiments of the tire of the second embodiment as if fully set forth in this section.

Methods for Improving Wet and Dry Traction

As discussed above, according to the third embodiment disclosed herein, a method is provided for improving the wet and dry traction of a tire tread. More specifically, according to the method, 1 to 40 phr of at least one polyurethane including a saturated hydroxy-functionalized polydiene segment as diol is incorporated into a rubber composition comprising: 100 parts of at least one conjugated diene containing polymer or copolymer; 20 to 200 phr of at least one carbon black filler, at least one silica filler, or a combination thereof; and no more than 15 phr of oil. Use of the polyurethane results in the tire tread having an increase in both wet traction and dry traction, together with either: (a) an increase in rolling resistance of no more than 50% of the average increase in wet and dry traction, or (b) a decrease in rolling resistance. The relative increases or decreases (i.e., in wet traction, dry traction and rolling resistance) being as compared to a tire tread containing the same ingredients other than lacking the polyurethane. More specifically, the comparative tire tread containing the same ingredients other than lacking the polyurethane not only lacks the polyurethane, but replaces the polyurethane with an equivalent amount of low PCA oil (preferably a petroleum-sourced low PCA such as Ergon's BLACK OIL or a comparable oil).

By stating that the tire tread has an increase in both wet traction and dry traction is meant that each of wet traction and dry traction increase (improve) by at least 1% (e.g., 1%, 5%, 10%, 15%, 20%, 25%, 30%, 35%, 40%, 45%, 50%, 55%, 60%, 65%, 70%, 75%, 80%, 85%, 90%, 95%, 100%, or more), preferably at least 5% or at least 10%. In certain embodiments of the first-third embodiments, the wet traction increases by 1-50% or by 5-50% and the dry traction increases by 1-50% or by 5-50%.

In certain embodiments of the first-third embodiments, the increase in wet traction and dry traction (as discussed above) is accompanied by an increase in rolling resistance, although the increase is no more than 50% (e.g., 50%, 45%, 40%, 35%, 30%, 25%, 20%, 15%, 10%, 5%, 4%, 3%, 2%, or 1%) of the average of the increase in wet and dry traction. As a non-limiting example, if the increase in wet traction were 20% and the increase in dry traction were 10%, according to such embodiments, the rolling resistance increase would be no more than 15%.

In other embodiments of the first-third embodiments, the increase in wet traction and dry traction (as discussed above)

is accompanied by a decrease in rolling resistance. According to such embodiments, the decrease in rolling resistance is of at least 1% (e.g., 1%, 2%, 3%, 4%, 5%, 10%, 15%, 20%, 25%, 30%, 35%, 40%, 45%, 50% or more) preferably at least 5% or at least 10%.

As discussed in more detail with respect to the Examples provided below, an improvement in wet traction is preferably measured by an increase in the storage modulus (G') of a tread rubber composition at 0° C., as compared to the comparative tread rubber composition, as discussed above. An improvement in dry traction is preferably measured by an increase in the storage modulus (G') of a tread rubber composition at 30° C., as compared to the comparative tread rubber composition, as discussed above. An improvement in ice or snow traction is preferably measured by a decrease in the storage modulus (G') of a tread rubber composition at −30° C., as compared to the comparative tread rubber composition, as discussed above. An improvement in rolling resistance is preferably measured by a decrease in the tan δ measurement at 60° C. of a tread rubber composition as compared to the comparative tread rubber composition, as discussed above.

In certain embodiments of the first-third embodiments disclosed herein, one or more additional properties of the tread rubber composition are also improved by the use of the polyurethane. These additional properties include, but are not limited to, elongation at break (Eb), tension at break (Tb), M50, and M100. Measurements of Eb and Tb provide an indication of a rubber composition's tear resistance, which is particularly relevant when it is incorporated into a tire tread. The abbreviation M50 is used for tensile stress at 50% elongation and the abbreviation M100 is used for tensile stress at 100% elongation. These values are sometimes referred to as modulus at 50% and modulus at 100%, although they do not represent true modulus measurements.

Methods for Preparing Rubber Compositions

Rubber compositions according to the first-third embodiments disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first-third embodiments, one non-productive master-batch mixing stage may be used in preparing the rubber composition. In certain embodiments of the first-third embodiments, more than one non-productive master-batch mixing stage is used. In certain embodiments of the first-third embodiments where silica and silica coupler is utilized, more than one non-productive master-batch mixing stage is used and at least a portion of the silica filler is added in a second non-productive master-batch mixing stage (also described as a re-mill stage); in certain such embodiments, all silica coupling agent is added only in the second non-productive master-batch mixing stage (along with at least a portion of the silica filler) and no silica coupling agent is added in an initial non-productive master-batch mixing stage.

In certain embodiments of the fifth and sixth embodiments, the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixing being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

In certain embodiments of the first-third embodiments, the rubber composition is prepared by a process with the non-productive master batch mixing stage(s) conducted at a temperature of about 130° C. to about 200° C. In certain embodiments of the first-third embodiments, the rubber composition is prepared by a process with the final productive mixing stage conducted at a temperature below the vulcanization temperature in order to avoid unwanted precure of the rubber composition. Therefore, the temperature of the productive mixing stage should not exceed about 120° C. and is typically about 40° C. to about 120° C., or about 60° C. to about 110° C. and, especially, about 75° C. to about 100° C.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular saturated hydroxy-functionalized polydiene and isocyanate utilized in preparing the polyurethanes of the following examples and their respective amounts should not be interpreted as limiting since other such ingredients and amounts consistent with the disclosure in the Detailed Description can be utilized in substitution. Furthermore, the particular ingredients (e.g., carbon black, silica, conjugated diene-containing polymer(s), oil and cure package ingredients) as well as their particular amounts used in preparing the rubber compositions of the following examples also should not be interpreted as limiting since other such ingredients and amounts consistent with the disclosure in the Detailed Description can be utilized in substitution.

Examples 1-3 (Preparation of Polyurethanes)

Three polyurethanes according to the present disclosure were prepared from saturated hydroxy-functionalized polydienes having the properties listed in Table 1 and utilizing toluene diisocyanate (TDI) as isocyanate. Toluene in the amount indicated in Table 1 was used as a solvent for the saturated hydroxy-functionalized polydienes which were each used in an amount of 100 grams. The materials (polydiene in toluene and TDI) were mixed and allowed to react for thirty minutes at a temperature of 65° C. Thereafter, a quantity of 1,4-butane diol as chain extender in the amount indicated in Table 1 was added and the materials were allowed to react for five hours at 65° C., followed by 5 hours at 50° C.

TABLE 1

|  | Mn (grams/mole) | Mw (grams/mole) | Toluene (grams) | TDI (mL) | 1,4-butane diol (mL) |
|---|---|---|---|---|---|
| Example 1 | 1562 (NMR) 1881 (GPC) | 2998 | 190.1 | 28.69 | 13.29 |
| Example 2 | 2245 (NMR) 2275 (GPC) | 3603 | 247.3 | 14.35 | 6.65 |
| Example 3 | 3754 (NMR) 3205 (GPC) | 3867 | 242.7 | 9.56 | 4.43 |

After removal of solvent, polyurethanes having the properties listed in Table 2 had been prepared. The Mn and Mw values for the polyurethanes were measured by GPC using a polystyrene standard. Tg values were measured by DSC.

TABLE 2

|  | Mn (grams/mole) | Mw (grams/mole) | Mw/Mn | Tg (° C.) |
|---|---|---|---|---|
| Example 1 | 14239 | 107855 | 7.58 | −26.80 |
| Example 2 | 25640 | 117172 | 4.57 | −29.96 |
| Example 3 | 35917 | 107094 | 2.98 | −30.35 |

Examples 4-A to 4-F

Silica-filler containing rubber compositions were prepared using varying amounts of the polyurethanes prepared in Examples 1-3. The formulation for each set of rubber compositions is shown in Table 3, where the amounts of ingredients are listed in phr. Example 4-A is considered a control since it does not contain any polyurethane.

TABLE 3

|  | Master Batch ||||||
|---|---|---|---|---|---|---|
|  | 4-A | 4-B | 4-C | 4-D | 4-E | 4-F |
| SBR | 80 | 80 | 80 | 80 | 80 | 80 |
| Natural rubber | 20 | 20 | 20 | 20 | 20 | 20 |
| Polyurethane of Example . . . | N/A | 1 | 2 | 3 | 3 | 1 |
| Amount of polyurethane | 0 | 10 | 10 | 10 | 5 | 5 |
| Silica | 52.5 | 52.5 | 52.5 | 52.5 | 52.5 | 52.5 |
| Wax | 2 | 2 | 2 | 2 | 2 | 2 |
| Oil | 10 | 0 | 0 | 0 | 5 | 5 |
| Stearic acid | 2 | 2 | 2 | 2 | 2 | 2 |
| 6PPD[1] | 0.95 | 0.95 | 0.95 | 0.95 | 0.95 | 0.95 |
| Re-mill |  |  |  |  |  |  |
| Silica | 2.5 | 2.5 | 2.5 | 2.5 | 2.5 | 2.5 |
| Silane[2] | 5 | 5 | 5 | 5 | 5 | 5 |

TABLE 3-continued

|  | Master Batch ||||||
|---|---|---|---|---|---|---|
|  | 4-A | 4-B | 4-C | 4-D | 4-E | 4-F |
| Final |  |  |  |  |  |  |
| Sulfur | 1.5 | 1.5 | 1.5 | 1.5 | 1.5 | 1.5 |
| Accelerators[3] | 4.1 | 4.1 | 4.1 | 4.1 | 4.1 | 4.1 |
| Zinc oxide | 2.5 | 2.5 | 2.5 | 2.5 | 2.5 | 2.5 |

[1]N-(1,3-dimethylbutyl)-N'-phenyl-phenylenediamine
[2]bis(triethoxysilylpropyl)disulfide
[3]TBBS, MBTS, and DPG Certain properties of the rubber compositions were measured and are reported below in Table 4. Indexed values were calculated by dividing the value for a rubber composition according to the present disclosure (i.e., Examples 4-B through 4-F) by control 4-A.

Tan δ at 60° C. and 0° C., G* at −20° C., and G' at 30° C. values were measured using a temperature sweep test conducted with an Advanced Rheometric Expansion System (ARES) from TA Instruments. The test specimen has a rectangular geometry having a length of 47 mm, a thickness of 2 mm, and a width of 12.7 mm. The length of specimen between the grips on the test machine, i.e., the gap, is approximately 27 mm. The test is conducted using a frequency of 3.14 rad/sec. The temperature is started at −115° C. and increased to 100° C. The strain is 0.25% for the temperature range of −115° C. to −11° C., and 2% for the temperature range of −10° C. to 100° C.

The Mooney viscosities disclosed herein for the rubber compositions were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor started. The Mooney viscosity was recorded for each sample as the torque at four minutes after the rotor started.

Tensile mechanical properties of the samples were determined following the guidelines of, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). The specimens were tested at 23° C., unless otherwise indicated. Samples had been cured for 20 minutes at 155° C. After curing, samples for room temperature testing were conditioned by allowing them to sit in the lab for at least 24 hours at room temperature before performing room temperature testing.

TABLE 4

|  | Polyurethane of Example . . . |||||
|---|---|---|---|---|---|
|  | N/A | 1 | 2 | 3 | 3 | 1 |
|  | Amount of polyurethane |||||
|  | 0 | 10 | 10 | 10 | 5 | 5 |
| Property | 4-A | 4-B | 4-C | 4-D | 4-E | 4-F |
| Indexed Mooney viscosity | 100 | 140 | 140 | 133 | 115 | 115 |
| Indexed M50 (23° C.) in MPa | 100 | 107 | 102 | 110 | 107 | 101 |
| Indexed M100 (23° C.) in MPa | 100 | 102 | 96 | 106 | 105 | 98 |

TABLE 4-continued

| | Polyurethane of Example . . . | | | | | |
|---|---|---|---|---|---|---|
| | N/A | 1 | 2 | 3 | 3 | 1 |
| | | | Amount of polyurethane | | | |
| | 0 | 10 | 10 | 10 | 5 | 5 |
| Property | 4-A | 4-B | 4-C | 4-D | 4-E | 4-F |
| Indexed Tb (23° C.) in MPa | 100 | 90 | 85 | 79 | 92 | 88 |
| Indexed Eb (%) at 23° C. | 100 | 92 | 94 | 85 | 94 | 93 |
| Indexed G' (MPa) at −30° C., 0.2%, 10 Hz | 100 | 108 | 109 | 108 | 105 | 103 |
| Indexed G' (MPa) at 0° C., 0.2%, 10 Hz | 100 | 140 | 127 | 121 | 117 | 128 |
| Indexed G' (MPa) at 30° C., 0.2%, 10 Hz | 100 | 138 | 127 | 119 | 113 | 127 |
| Indexed Tan δ @ 60° C., 2%, 10 Hz | 100 | 120 | 103 | 98 | 105 | 112 |

As can be seen from the data of Table 4, the use of the polyurethanes of Examples 1-3 in rubber compositions 4-B to 4-F resulted in a consistent improvement in the wet traction and dry traction properties (increases) of the rubber compositions as compared to the control rubber composition. The use of the polyurethanes also resulted in a consistent improvement (increase) in M50 in rubber compositions 4-B to 4-F as compared to the control rubber composition. As to the rolling resistance, the use of the polyurethane of Example 3 in an amount of 10 phr (i.e., in composition 4-D) resulted in an improvement (decrease) in rolling resistance, whereas the use of only 5 phr did not. The use of the polyurethanes of either Example 1 or Example 2 or Example 3 at 5 phr (i.e., in compositions 4-B, 4-C, 4-E and 4-F) resulted in an increase in rolling resistance which is at most about 50% of the average increase in wet and dry traction. The complete or partial replacement of the processing oil with polyurethane resulting in rubber compositions with improved M50 values and improved M100 values (other than composition 4-C) indicates that the removal of some or all of the oil did not result in a decrease in filler dispersion throughout the rubber composition, which result can be described as unexpected.

Examples 5-A to 5-F

Carbon black-filled rubber compositions were prepared using varying amounts of the polyurethanes prepared in Examples 1-3. The formulation for each set of rubber compositions is shown in Table 5, where the amounts of ingredients are listed in phr. Example 5-A is considered a control since it does not contain any polyurethane.

TABLE 5

| | Master Batch | | | | | |
|---|---|---|---|---|---|---|
| | 5-A | 5-B | 5-C | 5-D | 5-E | 5-F |
| SBR | 100 | 100 | 100 | 100 | 100 | 100 |
| Polyurethane of Example . . . | N/A | 1 | 2 | 3 | 3 | 1 |
| Amount of polyurethane | 0 | 10 | 10 | 10 | 5 | 5 |
| Carbon black[1] | 50 | 50 | 50 | 50 | 50 | 50 |
| Wax | 2 | 2 | 2 | 2 | 2 | 2 |
| Oil | 10 | 0 | 0 | 0 | 5 | 5 |
| Stearic acid | 2 | 2 | 2 | 2 | 2 | 2 |
| 6PPD[2] | 0.95 | 0.95 | 0.95 | 0.95 | 0.95 | 0.95 |
| Re-mill | N/A | N/A | N/A | | | |

TABLE 5-continued

| | Master Batch | | | | | |
|---|---|---|---|---|---|---|
| | 5-A | 5-B | 5-C | 5-D | 5-E | 5-F |
| Final | | | | | | |
| Sulfur | 1.5 | 1.5 | 1.5 | 1.5 | 1.5 | 1.5 |
| Accelerators[3] | 1.3 | 1.3 | 1.3 | 1.3 | 1.3 | 1.3 |
| Zinc oxide | 2.5 | 2.5 | 2.5 | 2.5 | 2.5 | 2.5 |

[1]N343 grade
[2]N-(1,3-dimethylbutyl)-N'-phenyl-phenylenediamine
[3]TBBS, MBTS, and DPG Certain properties of the rubber compositions were measured and are reported below in Table 6. Indexed values were calculated by dividing the value for a rubber composition according to the present disclosure (i.e., Examples 6-B through 6-F) by control 6-A.

TABLE 6

| | Polyurethane of Example . . . | | | | | |
|---|---|---|---|---|---|---|
| | N/A | 1 | 2 | 3 | 3 | 1 |
| | | | Amount of polyurethane | | | |
| | 0 | 10 | 10 | 10 | 5 | 5 |
| Property | 5-A | 5-B | 5-C | 5-D | 5-E | 5-F |
| Indexed Mooney viscosity | 100 | 126 | 123 | 129 | 115 | 112 |
| Indexed M50 (23° C.) in MPa | 100 | 111 | 112 | 107 | 104 | 102 |
| Indexed M100 (23° C.) in MPa | 100 | 102 | 106 | 107 | 106 | 96 |
| Indexed Tb (23° C.) in MPa | 100 | 89 | 94 | 92 | 105 | 104 |
| Indexed Eb (%) at 23° C. | 100 | 100 | 98 | 90 | 99 | 111 |
| Indexed G' (MPa) at −30° C., 0.2%, 10 Hz | 100 | 105 | 121 | 129 | 127 | 128 |
| Indexed G' (MPa) at 0° C., 0.2%, 10 Hz | 100 | 193 | 141 | 103 | 103 | 130 |
| Indexed G' (MPa) at 30° C., 0.2%, 10 Hz | 100 | 187 | 132 | 101 | 99 | 129 |
| Indexed Tan δ @ 60° C., 2%, 10 Hz | 100 | 145 | 111 | 91 | 93 | 118 |

As can be seen from the data of Table 6, the use of the polyurethanes of Examples 1 and 2 resulted in an improvement in the wet traction and dry traction properties (increases) of the rubber compositions as compared to the control rubber composition. The use of the polyurethane of Example 3 in an amount of 5 phr resulted in an almost comparable (99%) wet traction as compared to the control rubber composition, while the result of somewhat more (10 phr) resulted in an improvement (101%) in wet traction as compared to the control rubber composition. The use of the polyurethanes of Examples 1-3 also resulted in a consistent improvement (increase) in M50 and M100 in rubber compositions 5-B to 5-F as compared to the control rubber composition. As to the rolling resistance, the use of the polyurethane of Example 3 (i.e., in compositions 5-D and 5-E) resulted in an improvement (decrease) in rolling resistance. The use of the polyurethanes of Example 2 (i.e., in composition 5-C) resulted in an increase in rolling resistance which is 30% of the average increase in wet and dry traction. As to Tb and Eb values, the use of 5 phr of the polyurethane of Example 3 resulted in an improvement (increase) in Tb whereas the use of 5 phr of the polyurethane of Example 1 resulted in an improvement (increase) in both Tb and Eb. The complete or partial replacement of the processing oil with polyurethane resulting in rubber compositions with improved M50 values and improved M100 values indicates that the removal of some or all of the oil did not result in a decrease in filler dispersion throughout the rubber composition, which result can be described as unexpected.

Examples 6-A to 6-F

Silica-filler containing rubber compositions were prepared using varying amounts of the polyurethanes prepared in Examples 1-3. The formulation for each set of rubber compositions is shown in Table 7, where the amounts of ingredients are listed in phr. Example 6-A is considered a control since it does not contain any polyurethane.

TABLE

| | Master Batch | | | | | |
|---|---|---|---|---|---|---|
| | 6-A | 6-B | 6-C | 6-D | 6-E | 6-F |
| SBR | 100 | 100 | 100 | 100 | 100 | 100 |
| Polyurethane of Example . . . | N/A | 1 | 1 | 2 | 3 | 3 |
| Amount of polyurethane | 0 | 2 | 4 | 4 | 2 | 4 |
| Silica | 55 | 55 | 55 | 55 | 55 | 55 |
| Silane[1] | 4.4 | 4.4 | 4.4 | 4.4 | 4.4 | 4.4 |
| Wax | 2 | 2 | 2 | 2 | 2 | 2 |
| Oil | 10 | 8 | 6 | 6 | 8 | 6 |
| Stearic acid | 2 | 2 | 2 | 2 | 2 | 2 |
| 6PPD[2] | 0.95 | 0.95 | 0.95 | 0.95 | 0.95 | 0.95 |
| Re-mill | N/A | N/A | N/A | N/A | N/A | N/A |
| Final | | | | | | |
| Sulfur | 1.4 | 1.4 | 1.4 | 1.4 | 1.4 | 1.4 |
| Accelerators[3] | 4.1 | 4.1 | 4.1 | 4.1 | 4.1 | 4.1 |
| Zinc oxide | 2.5 | 2.5 | 2.5 | 2.5 | 2.5 | 2.5 |

[1]Mixture of bis(triethoxysilylpropyl)disulfide and bis(triethoxysilylpropyl)trisulfide
[2]N-(1,3-dimethylbutyl)-N'-phenyl-phenylenediamine
[3]TBBS, MBTS, and DPG Certain properties of the rubber compositions were measured and are reported below in Table 8. Indexed values were calculated by dividing the value for a rubber composition according to the present disclosure (i.e., Examples 6-B through 6-F) by control 6-A.

TABLE 8

| | Polyurethane of Example . . . | | | | | |
|---|---|---|---|---|---|---|
| | N/A | 1 | 1 | 2 | 3 | 3 |
| | Amount of polyurethane | | | | | |
| | 0 | 2 | 4 | 4 | 2 | 4 |
| Property | 6-A | 6-B | 6-C | 6-D | 6-E | 6-F |
| Indexed Mooney viscosity | 100 | 97 | 92 | 96 | 98 | 95 |
| Indexed M50 (23° C.) in MPa | 100 | 95 | 90 | 94 | 96 | 91 |
| Indexed M100 (23° C.) in MPa | 100 | 97 | 91 | 93 | 98 | 93 |
| Indexed Tb (23° C.) in MPa | 100 | 103 | 79 | 118 | 104 | 120 |
| Indexed Eb (%) at 23° C. | 100 | 107 | 94 | 122 | 103 | 122 |
| Indexed G' (MPa) at −30° C., 0.2%, 10 Hz | 100 | 102 | 90 | 100 | 107 | 102 |
| Indexed G' (MPa) at 0° C., 0.2%, 10 Hz | 100 | 105 | 93 | 100 | 110 | 105 |
| Indexed G' (MPa) at 30° C., 0.2%, 10 Hz | 100 | 107 | 96 | 103 | 110 | 105 |
| Indexed Tan δ @ 60° C., 2%, 10 Hz | 100 | 100 | 99 | 100 | 92 | 94 |

As can be seen from the data of Table 8, the use of the polyurethanes of Examples 2 or 3 in rubber compositions 6-D to 6-F resulted in a consistent improvement in the wet traction and dry traction properties (increases) of the rubber compositions as compared to the control rubber composition. While the use of 2 phr of the polyurethane of Example 1 resulted in an improvement in the wet and dry traction of rubber composition 6-B, the use of 4 phr (composition 6-C) did not. The use of the polyurethanes also resulted in a consistent decrease in Mooney viscosity in rubber compositions 6-B to 6-F as compared to the control rubber composition. As to the rolling resistance, the use of the polyurethane of Example 3 (i.e., in compositions 6-E and 6-F) resulted in an improvement (decrease) in rolling resistance. While the use of the polyurethanes of Examples 1 and 2 did not result in a consistent improvement in rolling resistance, at most the rolling resistance was maintained, which in view of the corresponding improvements in wet and dry traction can be viewed as a beneficial result in rolling resistance. The use of the polyurethanes of Examples 2 and 3, resulted in consistent improvements (increases) in both Tb and Eb. While the use of 2 phr of the polyurethane of Example 1 resulted in an improvement in both Tb and Eb, the use of 4 phr did not.

Examples 7-A to 7-F

Additional silica-filler containing rubber compositions were prepared using varying amounts of the polyurethanes prepared in Examples 1-3. The formulation for each set of rubber compositions is shown in Table 9, where the amounts of ingredients are listed in phr. Example 7-A is considered a control since it does not contain any polyurethane.

TABLE 9

| | Master Batch | | | | | |
|---|---|---|---|---|---|---|
| | 7-A | 7-B | 7-C | 7-D | 7-E | 7-F |
| SBR | 100 | 100 | 100 | 100 | 100 | 100 |
| Polyurethane of Example . . . | N/A | 1 | 2 | 3 | 3 | 1 |
| Amount of polyurethane | 0 | 8 | 8 | 8 | 4 | 4 |
| Silica | 45 | 45 | 45 | 45 | 45 | 45 |
| Silane[1] | 4.5 | 4.5 | 4.5 | 4.5 | 4.5 | 4.5 |
| Wax | 2 | 2 | 2 | 2 | 2 | 2 |

TABLE 9-continued

| | Master Batch | | | | | |
|---|---|---|---|---|---|---|
| | 7-A | 7-B | 7-C | 7-D | 7-E | 7-F |
| Oil | 8 | 0 | 0 | 0 | 4 | 4 |
| Stearic acid | 2 | 2 | 2 | 2 | 2 | 2 |
| 6PPD[2] | 1 | 1 | 1 | 1 | 1 | 1 |
| Re-mill | N/A | N/A | N/A | N/A | N/A | N/A |
| Final | | | | | | |
| Sulfur | 1.5 | 1.5 | 1.5 | 1.5 | 1.5 | 1.5 |
| Accelerators[3] | 4.5 | 4.5 | 4.5 | 4.5 | 4.5 | 4.5 |
| Zinc oxide | 2.5 | 2.5 | 2.5 | 2.5 | 2.5 | 2.5 |

[1]Mercaptosilane
[2]N-(1,3-dimethylbutyl)-N'-phenyl-phenylenediamine
[3]TBBS, MBTS, and DPG Certain properties of the rubber compositions were measured and are reported below in Table 10. Indexed values were calculated by dividing the value for a rubber composition according to the present disclosure (i.e., Examples 7-B through 7-F) by control 7-A.

TABLE 10

| | Polyurethane of Example . . . | | | | | |
|---|---|---|---|---|---|---|
| | N/A | 1 | 2 | 3 | 3 | 1 |
| | Amount of polyurethane | | | | | |
| Property | 0 7-A | 8 7-B | 8 7-C | 8 7-D | 4 7-E | 4 7-F |
| Indexed Mooney viscosity | 100 | 128 | 129 | 125 | 111 | 114 |
| Indexed M50 (23° C.) in MPa | 100 | 105 | 104 | 104 | 106 | 101 |
| Indexed M100 (23° C.) in MPa | 100 | 100 | 98 | 99 | 104 | 99 |
| Indexed Tb (23° C.) in MPa | 100 | 87 | 87 | 83 | 80 | 94 |
| Indexed Eb (%) at 23° C. | 100 | 93 | 93 | 88 | 83 | 98 |
| Indexed G' (MPa) at −30° C., 0.2%, 10 Hz | 100 | 161 | 155 | 148 | 119 | 125 |
| Indexed G' (MPa) at 0° C., 0.2%, 10 Hz | 100 | 136 | 129 | 119 | 113 | 117 |
| Indexed G' (MPa) at 30° C., 0.2%, 10 Hz | 100 | 127 | 126 | 117 | 113 | 114 |
| Indexed Tan δ @ 60° C., 2%, 10 Hz | 100 | 111 | 101 | 104 | 93 | 100 |

As can be seen from the data of Table 10, the use of the polyurethanes of Examples 1-3 in rubber compositions 7-B to 7-F resulted in a consistent improvement in the wet traction and dry traction properties (increases) of the rubber compositions as compared to the control rubber composition. The use of the polyurethanes also resulted in a consistent improvement (increase) in M50 in rubber compositions 7-B to 7-F as compared to the control rubber composition. While the use of the polyurethanes did not result in a consistent improvement in M100, those rubber compositions that did not have an increased M100 had a value that was almost comparable (98 or 99%) to the value of the control rubber composition. As to the rolling resistance, the use of the polyurethane of Example 3 in an amount of 4 phr (i.e., in composition 7-E) resulted in an improvement (decrease) in rolling resistance, although the use of 8 phr did not. The use of the polyurethanes of either Example 1 or Example 2 (i.e., in compositions 7-B, 7-C, and 7-F) resulted in an increase in rolling resistance which is at most about 17% of the average increase in wet and dry traction.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tread rubber composition comprising:
   a. 100 parts of at least one conjugated diene containing polymer or copolymer comprising at least one conjugated diene monomer;
   b. 20 to 200 phr of at least one carbon black filler, at least one silica filler, or a combination thereof; and
   c. 1 to 40 phr of at least one polyurethane including a saturated hydroxy-functionalized polydiene segment as diol, wherein the polyurethane has a Mw of 90,000 to 150,000 grams/mole; a Mn of 10,000 to 50,000 grams/mole; and a Mw/Mn of 2 to 10, with the Mw and Mn measured by GPC using a polystyrene standard, and a Tg of about −40 to about −20° C., and saturated refers to at least 90% of double bonds within the saturated hydroxy-functionalized polydiene segment having been saturated;
   wherein the tread rubber composition contains no more than 15 phr of oil, and wherein the tread rubber composition contains less than 10% by weight of the at least one polyurethane based upon the total weight of the tread rubber composition.

2. The tread rubber composition of claim 1, wherein the saturated hydroxy-functionalized polydiene segment has a number average of 1.6 to 2 terminal hydroxy groups per molecule.

3. The tread rubber composition of claim 1, wherein the saturated hydroxy-functionalized polydiene segment is formed from at least one diene monomer selected from $C_4$ to $C_{10}$ dienes.

4. The tread rubber composition of claim 1, wherein the at least one conjugated diene monomer of the at least one conjugated diene containing polymer or copolymer comprises a conjugated diene of $C_4$ to $C_{10}$.

5. The tread rubber composition of claim 1, wherein the saturated hydroxy-functionalized polydiene segment has a number average of 1.6 to 2 terminal hydroxy groups per molecule and a Mn of 500 to 20,000 grams/mole, wherein the Mn is measured by GPC using a polystyrene standard.

6. The tread rubber composition of claim 1, wherein the polyurethane includes an aromatic diisocyanate selected from the group consisting of 4,4'-diphenylmethane diisocyanate, toluene diisocyanate, isophorone diisocyanate, hexamethylene diisocyanate, ethylene diisocyanate, paraphenyl diisocyanate, and combinations thereof.

7. The tread rubber composition of claim 1, wherein the polyurethane includes an aromatic diisocyanate.

8. The tread rubber composition of claim 6, wherein the saturated hydroxy-functionalized polydiene segment has a Mn of 500 to 20,000 grams/mole, wherein the Mn is measured by GPC using a polystyrene standard.

9. The tread rubber composition of claim 1, wherein the polyurethane includes an aromatic diisocyanate selected from the group consisting of 4,4'-diphenylmethane diisocyanate, toluene diisocyanate, isophorone diisocyanate, hexamethylene diisocyanate, ethylene diisocyanate, paraphenyl diisocyanate, and combinations thereof.

10. The tread rubber composition of claim 5, wherein the polyurethane further comprises at least one chain extender selected from the group consisting of $C_2$-$C_{20}$ diols which are linear or branched, $C_2$-$C_{20}$ amines, and combinations thereof.

11. The tread rubber composition of claim 5, wherein the polyurethane contains 5 to 30% by weight of the saturated hydroxy-functionalized polydiene segment.

12. The tread rubber composition of claim 1, wherein the polyurethane contains 5 to 30% by weight of the saturated hydroxy-functionalized polydiene segment.

13. The tread rubber composition of claim 1, containing less than 5% by weight of the polyurethane, based upon the total weight of the tread rubber composition.

14. The tread rubber composition of claim 1, wherein (b) includes at least 50 phr of silica filler and 0 phr of carbon black filler.

15. The tread rubber composition of claim 1, wherein the polyurethane has a Tg of −34 to −26° C.

16. The tread rubber composition of claim 1, wherein the polyurethane further comprises at least one chain extender selected from the group consisting of $C_2$-$C_{20}$ diols that are linear or branched, $C_2$-$C_{20}$ amines, and combinations thereof.

17. A tire containing a tread made from the tread rubber composition according to claim 1.

* * * * *